United States Patent
Fitzwater et al.

(10) Patent No.: US 10,336,394 B2
(45) Date of Patent: Jul. 2, 2019

(54) FOLDABLE TRICYCLE

(71) Applicant: Radio Flyer Inc., Chicago, IL (US)

(72) Inventors: Jason Fitzwater, Chicago, IL (US);
Collin Ostergaard, Chicago, IL (US)

(73) Assignee: Radio Flyer Inc., Chicago, IL (US)

( * ) Notice: Subject to any disclaimer, the term of this patent is extended or adjusted under 35 U.S.C. 154(b) by 17 days.

(21) Appl. No.: 15/170,413

(22) Filed: Jun. 1, 2016

(65) Prior Publication Data

US 2016/0355230 A1 Dec. 8, 2016

Related U.S. Application Data

(60) Provisional application No. 62/169,891, filed on Jun. 2, 2015.

(51) Int. Cl.
*B62B 7/04* (2006.01)
*B62K 15/00* (2006.01)
(Continued)

(52) U.S. Cl.
CPC ............ *B62K 15/006* (2013.01); *B62B 7/042* (2013.01); *B62B 7/044* (2013.01); *B62B 7/08* (2013.01); *B62B 9/102* (2013.01); *B62B 9/14* (2013.01); *B62B 9/20* (2013.01); *B62B 9/245* (2013.01); *B62B 9/26* (2013.01); *B62J 17/08* (2013.01);
(Continued)

(58) Field of Classification Search
CPC ........ B62K 15/006; B62K 9/02; B62B 7/044; B62B 9/245
See application file for complete search history.

(56) References Cited

U.S. PATENT DOCUMENTS

| 94,056 A | 8/1869 | Allen |
| 638,112 A | 11/1899 | Graham |

(Continued)

FOREIGN PATENT DOCUMENTS

| CN | 87214877 | 8/1988 |
| CN | 2501783 | 7/2002 |

(Continued)

OTHER PUBLICATIONS

MyRider® Chariot/MyRider™ Trikes, http://www.angelesstore.com/index.php/MyRider™-Trikes/myrider-chariot.html, at least as early as Mar. 16, 2013.

(Continued)

*Primary Examiner* — Tony H Winner
*Assistant Examiner* — Michael R Stabley
(74) *Attorney, Agent, or Firm* — Barnes & Thornburg LLP

(57) ABSTRACT

A tricycle is provided having a front frame assembly, a rear frame assembly pivotally connected to the front frame assembly, and a release assembly connected to both the front frame assembly and the rear frame assembly to secure the rear frame assembly to the front frame assembly in a use position and alternately in a storage position. The release assembly is moveable to allow for transitioning the rear frame assembly to the storage position from the use position. A foot rest is connected to the tricycle and is also moveable between a use position and a storage position. The tricycle also has a restraint hoop and a canopy, and quick release mechanisms to removably secure the restraint hoop and the canopy to the tricycle.

9 Claims, 12 Drawing Sheets

(51) Int. Cl.

| | | |
|---|---|---|
| *B62J 17/08* | (2006.01) | |
| *B62J 25/00* | (2006.01) | |
| *B62M 1/38* | (2013.01) | |
| *B62K 9/02* | (2006.01) | |
| *B62B 7/08* | (2006.01) | |
| *B62B 9/10* | (2006.01) | |
| *B62B 9/14* | (2006.01) | |
| *B62B 9/20* | (2006.01) | |
| *B62B 9/24* | (2006.01) | |
| *B62B 9/26* | (2006.01) | |

(52) U.S. Cl.
CPC ............... *B62J 25/00* (2013.01); *B62K 9/02* (2013.01); *B62M 1/38* (2013.01)

(56) References Cited

U.S. PATENT DOCUMENTS

| | | | |
|---|---|---|---|
| 1,397,174 | A | 11/1921 | Morwood |
| 2,183,534 | A | 12/1939 | Bernier |
| 2,194,161 | A | 3/1940 | Cobb |
| 2,619,364 | A | 11/1952 | Carson |
| 2,630,333 | A | 3/1953 | Petersen |
| 2,806,709 | A | 9/1957 | Watson |
| 2,816,775 | A | 12/1957 | Costello |
| 2,914,336 | A | 11/1959 | Hibben, Jr. et al. |
| 3,265,402 | A | 8/1966 | Snyder |
| 3,432,015 | A | 3/1969 | Schwerdhofer |
| 3,485,507 | A | 12/1969 | Christof |
| 3,905,618 | A | 9/1975 | Miranda |
| 3,954,283 | A | 5/1976 | Boehm et al. |
| 4,142,736 | A | 3/1979 | Ackerfeldt et al. |
| 4,168,846 | A | 9/1979 | Carren |
| 4,457,529 | A | 7/1984 | Shamie et al. |
| 4,474,388 | A | 10/1984 | Wagner |
| 4,546,991 | A | 10/1985 | Allen et al. |
| 4,657,270 | A | 4/1987 | Allen et al. |
| 4,702,486 | A | 10/1987 | Tsuchie |
| 4,795,209 | A * | 1/1989 | Quinlan, Jr. ............ A47D 1/008 297/153 |
| D300,619 | S | 4/1989 | Phinney et al. |
| 4,840,260 | A | 6/1989 | Josereau |
| 5,028,066 | A | 7/1991 | Garth |
| 5,074,577 | A | 12/1991 | Kim |
| 5,087,040 | A | 2/1992 | Wu |
| RE33,939 | E | 5/1992 | Cheng |
| D332,591 | S | 1/1993 | Reely |
| D334,157 | S | 3/1993 | Tonelli |
| 5,201,540 | A | 4/1993 | Wu |
| D337,973 | S | 8/1993 | Mariol |
| 5,322,487 | A | 6/1994 | Nagano |
| 5,356,356 | A | 10/1994 | Hildebrandt et al. |
| D355,870 | S | 2/1995 | Dieudonne |
| 5,409,253 | A | 4/1995 | Cheng |
| 5,468,043 | A * | 11/1995 | Chien ............... A47D 1/02 297/135 |
| 5,586,778 | A | 12/1996 | Lindh et al. |
| 5,590,896 | A | 1/1997 | Eichhorn |
| 5,660,435 | A | 8/1997 | Eichhorn |
| 5,667,239 | A | 9/1997 | Yang |
| 5,765,857 | A | 6/1998 | Hsiao |
| 5,765,871 | A | 6/1998 | Wyman et al. |
| 5,829,585 | A | 11/1998 | Kao et al. |
| 5,887,889 | A | 3/1999 | Andrus |
| 5,924,713 | A | 7/1999 | Li |
| 5,954,349 | A | 9/1999 | Rutzel |
| 6,007,031 | A | 12/1999 | Tang |
| D427,112 | S | 6/2000 | Chaudeurge |
| 6,079,718 | A | 6/2000 | Liao |
| 6,102,431 | A | 8/2000 | Sutherland et al. |
| 6,105,998 | A | 8/2000 | Baechler et al. |
| 6,120,048 | A | 9/2000 | Li |
| 6,152,473 | A | 11/2000 | Shih |
| 6,152,476 | A | 11/2000 | Huang |
| D435,235 | S | 12/2000 | De Oliveira |
| 6,155,579 | A | 12/2000 | Eyman et al. |
| D436,560 | S | 1/2001 | Golenz |
| D436,896 | S | 1/2001 | Chiappepta et al. |
| D436,897 | S | 1/2001 | Chiappepta et al. |
| 6,267,404 | B1 * | 7/2001 | Yang ............... B62B 9/245 280/47.38 |
| 6,299,194 | B1 | 10/2001 | Chen |
| 6,302,421 | B1 | 10/2001 | Lee |
| 6,338,403 | B1 | 1/2002 | Costin et al. |
| D461,145 | S | 8/2002 | Chiappetta et al. |
| 6,530,589 | B1 | 3/2003 | Ma |
| 6,533,311 | B2 | 3/2003 | Kaneko et al. |
| 6,575,486 | B2 | 6/2003 | Ma |
| 6,584,207 | B1 | 6/2003 | Yoest et al. |
| 6,609,723 | B2 | 8/2003 | Chuang |
| D480,024 | S | 9/2003 | Gunter et al. |
| 6,612,598 | B2 | 9/2003 | Wu |
| D480,665 | S | 10/2003 | Gunter et al. |
| 6,634,711 | B2 | 10/2003 | Philips et al. |
| 6,644,676 | B2 | 11/2003 | Wu |
| D484,073 | S | 12/2003 | Heinemann et al. |
| 6,666,470 | B2 | 12/2003 | Li |
| 6,666,473 | B2 * | 12/2003 | Hartenstine ............ A47D 13/06 280/642 |
| D485,513 | S | 1/2004 | De Oliveira |
| 6,682,090 | B2 | 1/2004 | Chen |
| 6,685,206 | B1 | 2/2004 | Blake |
| 6,685,207 | B1 | 2/2004 | Blake |
| 6,719,319 | B2 | 4/2004 | Liao |
| 6,722,690 | B2 | 4/2004 | Lan |
| 6,726,233 | B1 | 4/2004 | Li |
| 6,739,616 | B2 | 5/2004 | Lin |
| 6,752,453 | B1 | 6/2004 | Yapp |
| 6,767,028 | B2 | 7/2004 | Britton et al. |
| 6,789,808 | B2 | 9/2004 | Yang |
| 6,840,527 | B1 | 1/2005 | Michelau et al. |
| 6,869,096 | B2 | 3/2005 | Allen et al. |
| 6,874,802 | B2 | 4/2005 | Gunter et al. |
| 6,935,649 | B2 | 8/2005 | Lim |
| 6,966,572 | B2 | 11/2005 | Michelau et al. |
| 7,000,928 | B2 | 2/2006 | Liao |
| 7,000,935 | B2 | 2/2006 | Gunter et al. |
| 7,000,939 | B2 | 2/2006 | Shapiro |
| D525,568 | S | 7/2006 | Baron |
| 7,077,420 | B1 | 7/2006 | Santoski |
| 7,086,657 | B2 | 8/2006 | Michelau et al. |
| 7,104,603 | B2 * | 9/2006 | Keegan ............... A47D 1/004 297/151 |
| 7,128,333 | B2 | 10/2006 | Reimers et al. |
| 7,137,644 | B2 | 11/2006 | Kimberley |
| 7,210,696 | B2 | 5/2007 | Kettler et al. |
| 7,219,920 | B2 | 5/2007 | Lin |
| 7,273,224 | B2 * | 9/2007 | Wang ............... B62B 9/245 224/409 |
| 7,281,725 | B1 | 10/2007 | Gunter et al. |
| D555,045 | S | 11/2007 | On |
| 7,296,819 | B2 | 11/2007 | Cunningham |
| 7,300,066 | B2 | 11/2007 | Kettler et al. |
| 7,347,443 | B2 | 3/2008 | Barton |
| D567,719 | S | 4/2008 | Grossman |
| D571,866 | S | 6/2008 | On |
| 7,390,012 | B2 | 6/2008 | Church |
| 7,396,039 | B2 | 7/2008 | Valdez et al. |
| 7,413,213 | B2 * | 8/2008 | Pike ............... B62B 7/08 280/47.38 |
| 7,422,230 | B2 | 9/2008 | Chuan |
| D582,489 | S | 12/2008 | Badanjo |
| D593,910 | S | 6/2009 | Calvin et al. |
| D594,788 | S | 6/2009 | Hartlaub et al. |
| D598,331 | S | 8/2009 | Tongish et al. |
| 7,571,925 | B2 * | 8/2009 | Pike ............... B62B 7/08 280/47.38 |
| 7,591,479 | B2 | 9/2009 | Golias |
| D604,777 | S | 11/2009 | On |
| 7,621,842 | B2 | 11/2009 | Kamiya et al. |
| 7,632,035 | B2 | 12/2009 | Cheng |
| 7,658,252 | B2 | 2/2010 | Shapiro |
| 7,694,980 | B2 | 4/2010 | Dotsey et al. |

(56) References Cited

U.S. PATENT DOCUMENTS

| | | | |
|---|---|---|---|
| 7,695,060 B2* | 4/2010 | Dubiel | A47D 1/103 297/148 |
| 7,766,359 B2 | 8/2010 | Klevana et al. | |
| 7,798,515 B2 | 9/2010 | Valdez et al. | |
| D627,265 S | 11/2010 | On | |
| 7,871,099 B2 | 1/2011 | Gilbertson et al. | |
| 7,909,353 B2 | 3/2011 | Nolan et al. | |
| 7,934,729 B2 | 5/2011 | Murphy et al. | |
| D645,381 S | 9/2011 | Bricker et al. | |
| 8,061,732 B2 | 11/2011 | Song et al. | |
| 8,104,777 B2 | 1/2012 | Liao | |
| D659,054 S | 5/2012 | Agati et al. | |
| D659,055 S | 5/2012 | Agati et al. | |
| D659,056 S | 5/2012 | Bricker et al. | |
| 8,191,920 B2 | 6/2012 | Zhang | |
| 8,226,111 B2 | 7/2012 | Valdez et al. | |
| 8,226,161 B2* | 7/2012 | Fiore, Jr. | A47D 1/004 297/148 |
| 8,262,114 B2 | 9/2012 | Jessie, Jr. | |
| 8,313,118 B2 | 11/2012 | Aiken | |
| 8,517,406 B2 | 8/2013 | Diekman et al. | |
| 8,844,960 B2 | 9/2014 | Young et al. | |
| D714,693 S | 10/2014 | Bartels | |
| 8,991,844 B2 | 3/2015 | Bricker et al. | |
| D735,090 S | 7/2015 | Baron | |
| 9,114,842 B2 | 8/2015 | Bartels | |
| 2002/0093177 A1 | 7/2002 | Chen | |
| 2003/0141695 A1 | 7/2003 | Chen | |
| 2003/0201621 A1 | 10/2003 | Jang | |
| 2005/0035646 A1 | 2/2005 | Everett | |
| 2005/0110239 A1 | 5/2005 | Michelau et al. | |
| 2005/0247506 A1 | 11/2005 | Rondeau et al. | |
| 2007/0045983 A1 | 3/2007 | Hong | |
| 2007/0222172 A1 | 9/2007 | Chen | |
| 2008/0277901 A1 | 11/2008 | Catelli | |
| 2009/0008164 A1 | 1/2009 | Shapiro | |
| 2009/0115151 A1 | 5/2009 | Van Dijk | |
| 2010/0289244 A1 | 11/2010 | Grossman | |
| 2010/0308550 A1 | 12/2010 | Li et al. | |
| 2010/0308561 A1 | 12/2010 | Diekman et al. | |
| 2010/0314855 A1 | 12/2010 | Mival et al. | |
| 2011/0012325 A1 | 1/2011 | Gower et al. | |
| 2011/0074125 A1 | 3/2011 | Aiken et al. | |
| 2011/0278815 A1 | 11/2011 | Khare | |
| 2012/0104712 A1 | 5/2012 | Kobayashi | |
| 2012/0306179 A1 | 12/2012 | Jessie, Jr. | |
| 2013/0056949 A1 | 3/2013 | Bricker et al. | |
| 2014/0103616 A1 | 4/2014 | Young | |
| 2014/0217696 A1 | 8/2014 | Bartels | |

FOREIGN PATENT DOCUMENTS

| | | |
|---|---|---|
| CN | 202029949 | 11/2011 |
| CN | 203246543 | 10/2013 |
| EP | 1937541 | 4/2007 |
| JP | S53042775 | 4/1978 |
| JP | S54160747 | 11/1979 |
| JP | 2003320983 | 11/2003 |
| JP | 2004099021 | 4/2004 |
| JP | 2006111222 | 4/2006 |
| TW | M447345 | 2/2013 |

OTHER PUBLICATIONS

MyRider® Tandom, http://www.angelesstore.com/index.php/MyRider™-Trikes/myrider-tandem.html, at least as early as Mar. 16, 2013.

3-in-1 SpinTrike Bike, http://www.toysrus.ca/product/index.jsp?productId+87124876&imageIndex+7, at least as early as Mar. 5, 2015.

Aluminum 3-in-1 Trike, http://www.toysrus.ca/product/index.jsp?productId+80573176, at least as early as Mar. 5, 2015.

International Search Report for related International Patent Application No. PCT/US2016/035479, dated Oct. 21, 2016.

\* cited by examiner

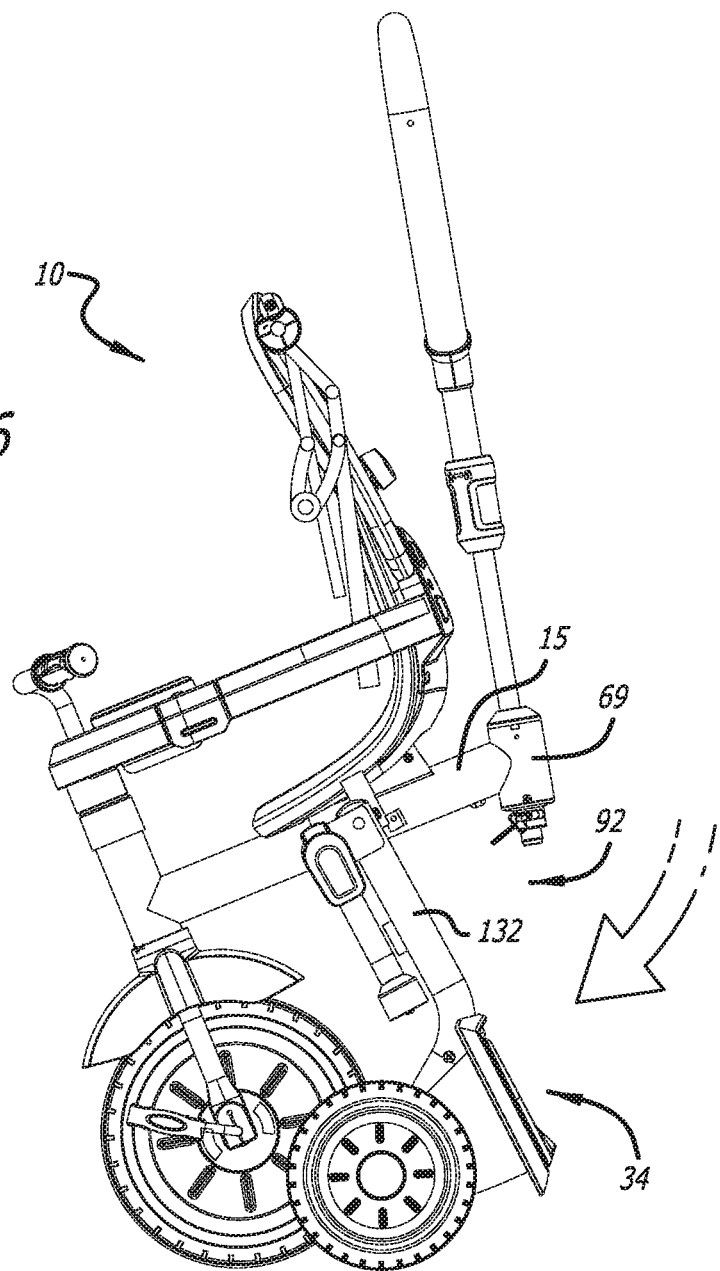

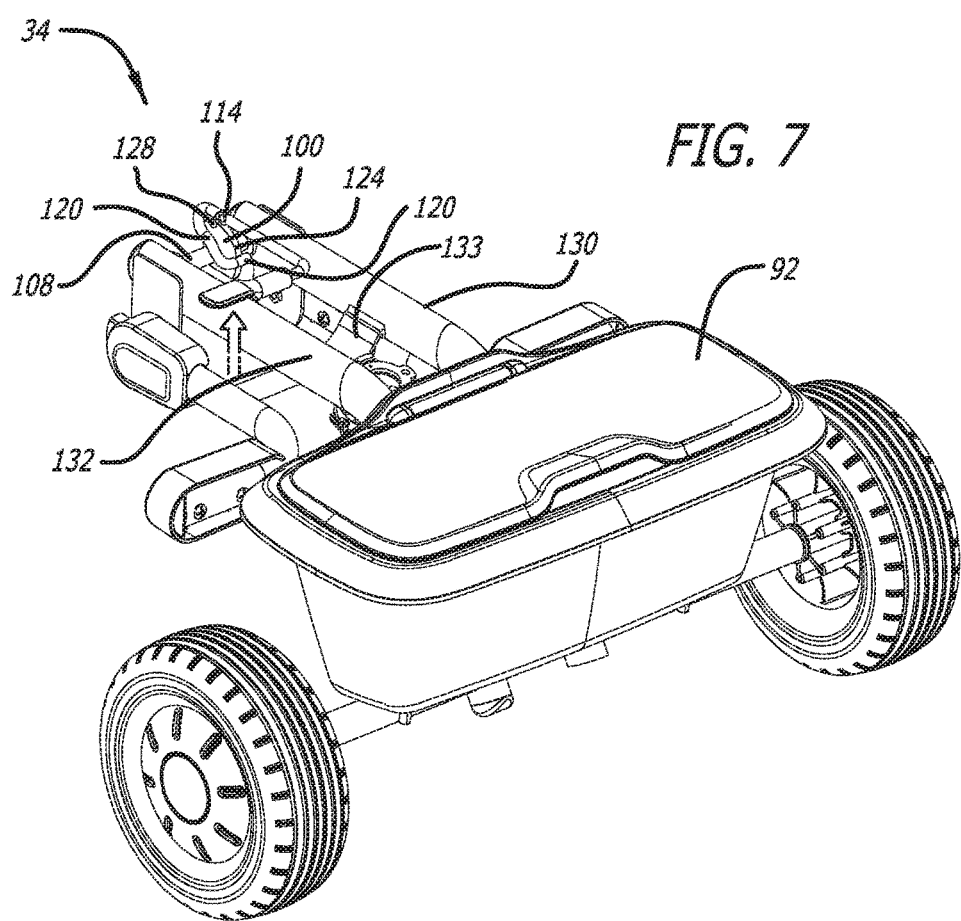

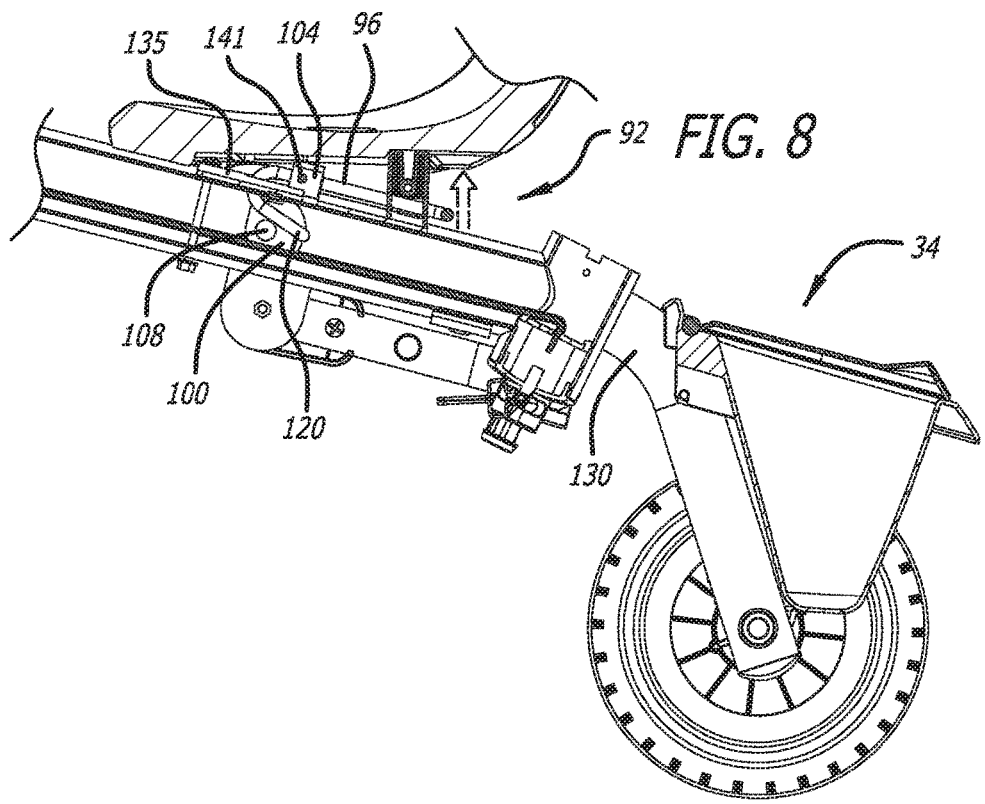
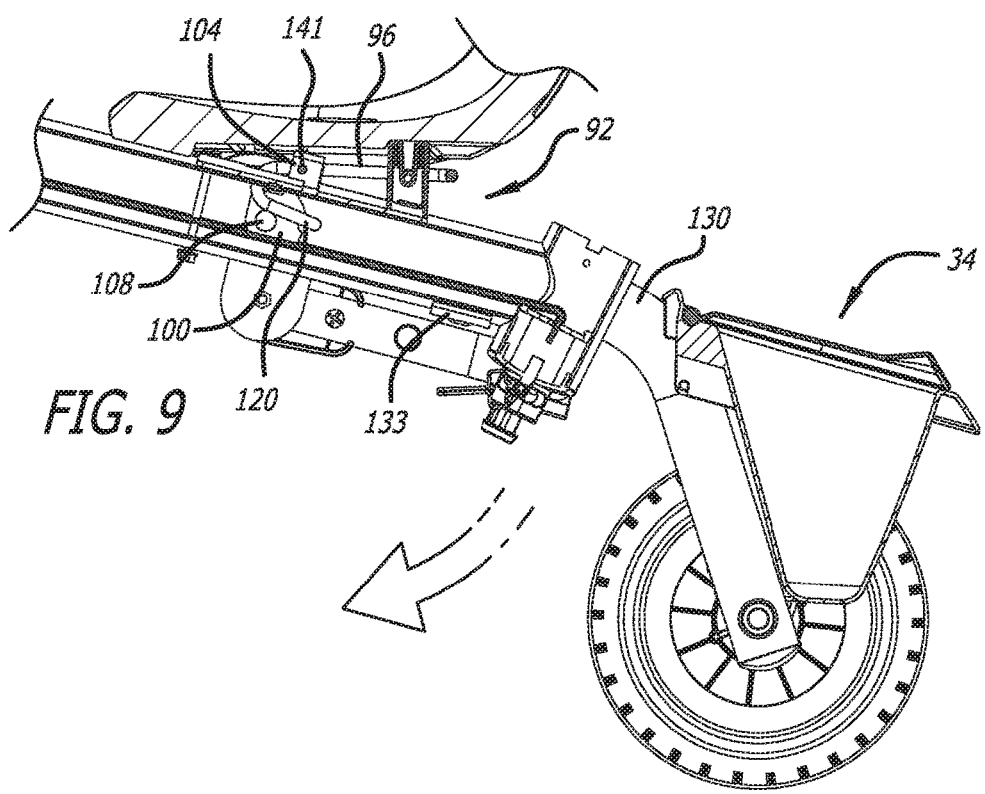

FOLDABLE TRICYCLE

CROSS-REFERENCE TO RELATED APPLICATIONS

This application claims the benefit of U.S. Provisional Patent Application No. 62/169,891, filed Jun. 2, 2015, which is expressly incorporated herein by reference and made a part hereof.

FEDERALLY SPONSORED RESEARCH OR DEVELOPMENT

Not Applicable.

TECHNICAL FIELD

The present disclosure generally relates to a tricycle that is foldable, and further to a tricycle having quick release mechanisms for transitioning various structures between use and storage positions. For example, a tricycle is provided with a rear frame having a quick release mechanism for allowing the rear frame to be able to fold into, and transition between, use and storage positions.

BACKGROUND

Standard tricycles are generally known in the art. Some tricycles include features such as a footrest for a seated child to use while an adult pushes the tricycle. Other tricycles include a substantially rigid restraining hoop and tray that extends around the seated child. Other tricycles also include a canopy for protecting the seated child from the sun. Further other tricycles allow for folding of the tricycle for storage purposes. However, the accessories or integrated features available on these and other known tricycles do not safely and purposefully include a quick release mechanism for allowing the accessories/features to quickly transition from the use to the storage position. Additionally, the folding mechanism on these and other known tricycles can make storing and transporting the tricycle difficult because they tend to enlarge the overall volumetric envelope or footprint the tricycle occupies. The present disclosure seeks to overcome certain of these limitations and other drawbacks of the prior art, and to provide new features not heretofore available. A full discussion of the features and advantages of the present disclosure is deferred to the following detailed description, which proceeds with reference to the accompanying drawings.

SUMMARY

According to one embodiment, the disclosed subject technology relates to a tricycle having a front frame assembly, a rear frame assembly pivotally connected to the front frame assembly, and a release assembly connected to both the front frame assembly and the rear frame assembly to secure the rear frame assembly to the front frame assembly in a use position and alternately in a storage position. The release assembly is moveable to allow for transitioning the rear frame assembly to the storage position from the use position.

The disclosed subject technology further relates to a tricycle comprising: a front frame assembly having a main frame tube, a front fork, a front wheel rotatably connected to the front fork, a seat connected to the main frame tube, and a handlebar assembly coupled to the fork to allow for steering of the tricycle, wherein the front fork and front wheel support a forward portion of the front frame assembly; a rear frame assembly pivotally connected to the main frame tube adjacent a rear portion of the front frame assembly to support the rear portion of the front frame assembly, the rear frame assembly having two wheels, a first rear frame support member on one side of the main frame tube, a second rear frame support member on an opposing side of the main frame tube, and a pivot shaft connecting the first and second rear frame support members and extending through the main frame tube; and, a release assembly connected to both the front frame assembly and the rear frame assembly to secure the rear frame assembly to the front frame assembly in a use position, the release assembly being moveable to allow for transitioning the rear frame assembly to a storage position and for securing the rear frame assembly in the storage position.

The disclosed subject technology further relates to a receiver connected to the main frame tube at the rear portion of the front frame assembly, and a steer handle removably connected to the receiver. In one embodiment, a steer mechanism connects the front fork with the steer handle to rotate the front fork with rotation of the steer handle. In another embodiment, the steer mechanism extends through the main frame tube. In one embodiment, the steer handle comprises an upper component and a lower component, the upper component being slidable with respect to the lower component to adjust a length of the steer handle. Preferably, the steer handle can remain connected to the front frame assembly as the rear frame assembly is transitioned to and retained in the storage position from the use position.

The disclosed subject technology further relates to a release assembly that comprises a plate secured to the pivot shaft, the plate having a use notch and a storage notch, and an engagement lever that is pivotally connected to the main frame tube and that can be releasably positioned to have a portion of the engagement lever alternately engaging the use notch and the storage notch. In an alternate embodiment, the release assembly further comprises a pivot bracket that retains a pivot pin. The pivot pin passes through an aperture in the engagement lever to pivotally secure the engagement lever to the pivot bracket. Additionally, in one embodiment, a biasing member engages the engagement lever to bias the engagement lever toward the plate to retain the engagement lever in one of the use notch and storage notch.

The disclosed subject technology further relates to a restraint hoop and a canopy connected to the seat, where the tricycle is adapted to transition from the use position to the storage position when the restraint hoop and canopy are connected to the seat. In one embodiment, quick release mechanisms connect the canopy to the seat and the restraint hoop to the seat.

The disclosed subject technology further relates to a footrest assembly connected to the tricycle. In one embodiment, the footrest assembly comprises a footrest support member having a footrest, a mounting member extending from the tricycle, the mounting member having a footrest use receiver and a footrest storage receiver, and a biased footrest button connected to a footrest pin. The footrest pin is adapted to be biased to selectively engage one of the footrest use receiver and the footrest storage receiver of the mounting member. The footrest support member is rotatably attached to the mounting member, and movement of the footrest button by a user causes the footrest pin to disengage from the mounting member to allow the footrest support member to rotate with respect to the plate. In one embodiment the footrest is connected to the rear frame assembly and rotates with the rear frame assembly.

The disclosed subject technology further relates to a tricycle comprising: a front frame assembly having a main frame tube, a front fork, a front wheel rotatably connected to the front fork, a seat connected to the main frame tube, and a handlebar assembly coupled to the fork to allow for steering of the tricycle, wherein the front fork and front wheel support a forward portion of the front frame assembly; a rear frame assembly pivotally connected to the main frame tube adjacent a rear portion of the front frame assembly to support the rear portion of the front frame assembly, the rear frame assembly having two wheels, a first rear frame support member on one side of the main frame tube, a second rear frame support member on an opposing side of the main frame tube, and a pivot shaft connecting the first and second rear frame support members and extending through the main frame tube; and, a release assembly connected to both the front frame assembly and the rear frame assembly to secure the rear frame assembly to the front frame assembly in a use position, the release assembly being moveable to allow for transitioning the rear frame assembly to a storage position and for securing the rear frame assembly in the storage position, wherein release assembly comprises a plate secured to the pivot shaft of the rear frame assembly, the plate having a use notch and a storage notch, and an engagement lever that is pivotally connected to the main frame tube and that can be releasably positioned to have a portion of the engagement lever alternately engaging the use notch and the storage notch.

The disclosed subject technology further relates to a tricycle comprising: a front frame assembly having a main frame tube, a front fork, a front wheel rotatably connected to the front fork, a seat connected to the main frame tube, and a handlebar assembly coupled to the fork to allow for steering of the tricycle, wherein the front fork and front wheel support a forward portion of the front frame assembly; a rear frame assembly connected to the main frame tube adjacent a rear portion of the front frame assembly to support the rear portion of the front frame assembly, the rear frame assembly having two wheels; and, a restraint hoop connected to the seat and extending toward the front fork, the restraint hoop having a first hoop arm and a second hoop arm, the restraint hoop further having tray extending from the first hoop arm to the second hoop arm, the tray having a first end and a second end, the first end of the tray being removably connected to the first hoop arm, the second end of the tray having a pivot member to allow the first end of the tray to pivot away from the first hoop arm when the first end is disconnected from the first hoop arm to allow for insertion and removal of a child from the seat.

The disclosed subject technology further relates to a tricycle comprising: a front frame assembly having a main frame tube, a front fork, a front wheel rotatably connected to the front fork, a seat connected to the main frame tube, and a handlebar assembly coupled to the fork to allow for steering of the tricycle, wherein the front fork and front wheel support a forward portion of the front frame assembly; a rear frame assembly connected to the main frame tube adjacent a rear portion of the front frame assembly to support the rear portion of the front frame assembly, the rear frame assembly having two wheels; and, a restraint hoop releasably connected to the seat and extending toward the front fork, the restraint hoop having a first hoop arm and a second hoop arm, wherein the seat has a receiver having a dock and a release member opening, wherein the first hoop arm has an attachment end having a quick release arm attachment mechanism comprising a release member and an arm spring, wherein the dock is sized to receive the attachment end of the first hoop arm, and wherein the release member is retained in the release member opening when the first hoop arm is inserted into the dock.

The disclosed subject technology further relates to a restraint hoop that has a first end connected to the seat and a second end connected to the seat, and wherein the restraint hoop further has a connection member removably connected to one of the handle bar assembly and the front frame assembly.

The disclosed subject technology further relates to a restraint hoop that has a rib, and wherein the first end of the tray has cutout that receives the rib to removably connect the first end of the tray to the first hoop arm of the restraint hoop.

The disclosed subject technology further relates to a seat that has a receiver having a dock and a release member opening, wherein the first hoop arm has an attachment end having a quick release arm attachment mechanism comprising a release member and an arm spring, wherein the dock is sized to receive the attachment end of the first hoop arm, and wherein the release member is retained in the release member opening when the first hoop arm is inserted into the dock.

The disclosed subject technology further relates to a seat that has a receiver having a dock and a release member opening, wherein the canopy has a canopy arm having an attachment end having a quick release arm attachment mechanism comprising a release member and an arm spring, wherein the dock is sized to receive the attachment end of the canopy arm, and wherein the release member is retained in the release member opening when the canopy arm is inserted into the dock.

It is understood that other embodiments and configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

To understand the present disclosure, it will now be described by way of example, with reference to the accompanying drawings in which embodiments of the disclosures are illustrated and, together with the descriptions below, serve to explain the principles of the disclosure.

FIG. 6 is a side view of the foldable tricycle of FIG. 1, showing a rear frame in a storage position.

FIG. 7 is a rear perspective view of the rear frame of FIG. 6.

FIG. 8 is a partially cut-away side view of the rear frame of FIG. 6, shown in a use position.

FIG. 9 is a partially cut-away side view of the rear frame of FIG. 6, shown during a transition from a use position to a storage position.

DETAILED DESCRIPTION

Figure 1:
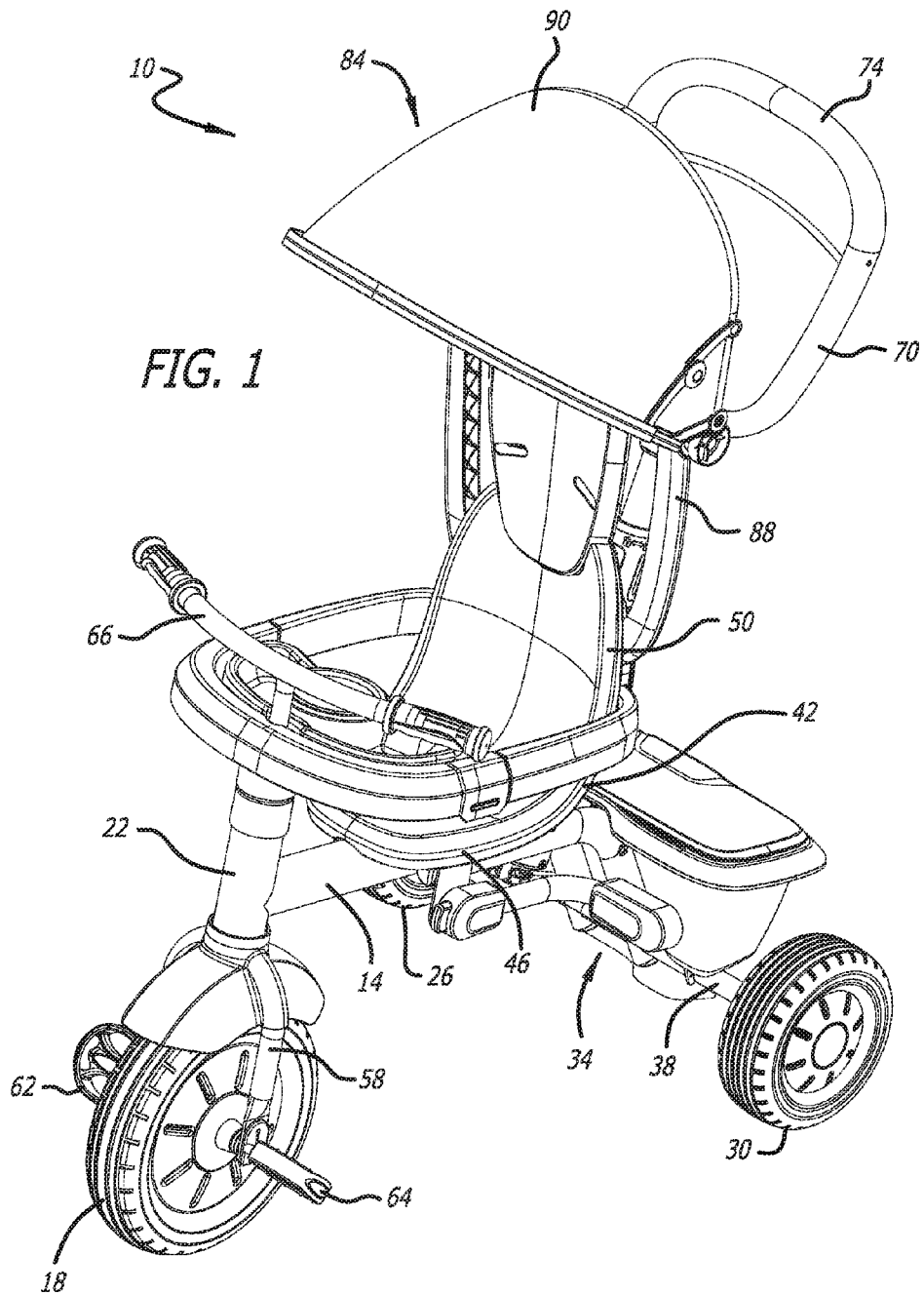
FIG. 1 is a front-top perspective view of a foldable tricycle according to one embodiment.

While the tricycle discussed herein is susceptible of embodiments in many different forms, there is shown in the drawings, and will herein be described in detail, preferred embodiments with the understanding that the present description is to be considered as an exemplification of the principles of the tricycle and is not intended to limit the broad aspects of the disclosure to the embodiments illustrated.

The foldable tricycle is a product that can be used by children from the infant stage through the toddler stage, and into the adolescent stage and beyond. For example, the foldable tricycle can operate as a stroller with a restraint hoop, a tray, a canopy and a handle for the parent, or other person, to push and steer the stroller. As the child grows, the restraint hoop, tray, and canopy can be removed, independently as desired by the user, such that the tricycle operates as a push tricycle. In the push tricycle stage, the foldable tricycle can be used as a traditional tricycle by the child, but the tricycle also includes footrests if the child gets tired of pedaling and chooses to rest his or her feet on the footrest while the parent uses the steer handle to push and steer the tricycle. Finally, when the child no longer needs the parent steer handle and/or the footrests, they can likewise be independently removed for use as a traditional tricycle. In any of these stages, the tricycle preferably includes a rear frame that is able to rotate between use and storage positions to reduce various tricycle dimensions for storage and transportation.

Figure 2:
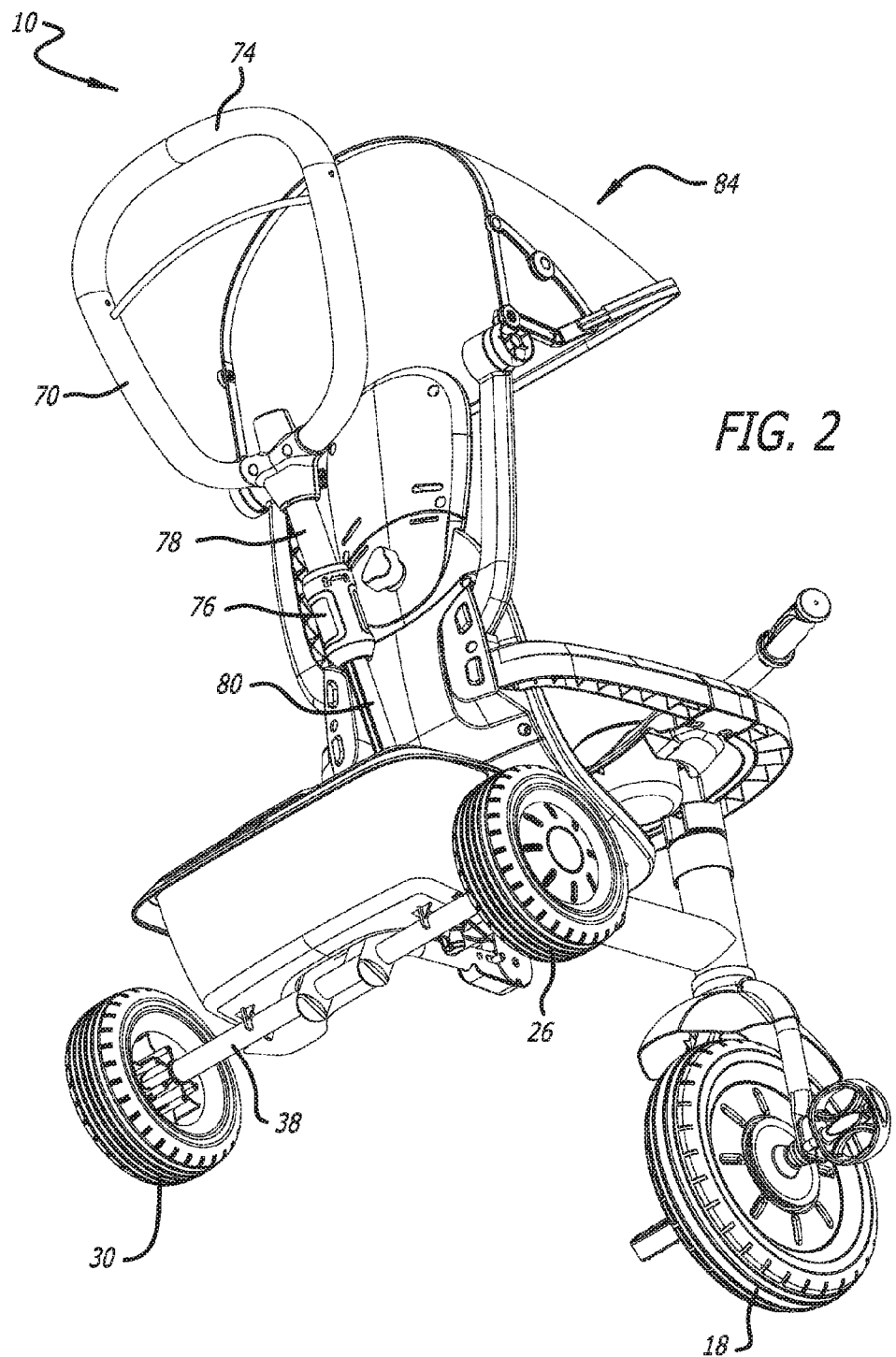
FIG. 2 is a rear-bottom perspective view of the foldable tricycle of FIG. 1.
Figure 3:
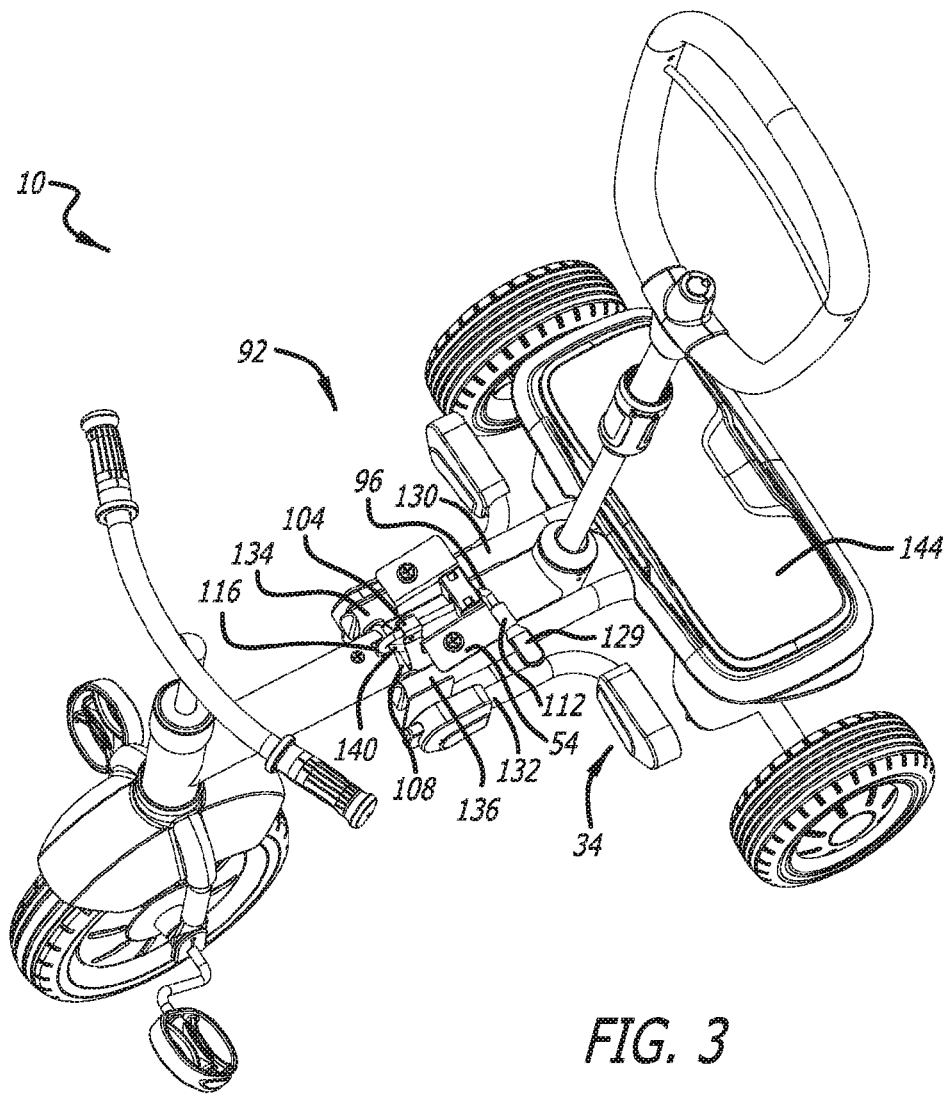
FIG. 3 is a front-top perspective view of the foldable tricycle of FIG. 1 with certain elements removed to show interior details.

Referring now to the figures, and initially to FIGS. 1-3, in one embodiment the foldable tricycle 10 may include a front frame assembly 14 and a rear frame assembly 34. The front frame assembly 14 may comprise main frame tube 15, and a front fork 58 and a front wheel 18 supporting a forward portion 22 of the front frame assembly 14. In one embodiment, a seat 42 is coupled to the main frame tube 15 of the front frame assembly 14. The seat 42 may include an integrally formed seat base 46 and a seat back 50. Alternatively, the seat 42 may be formed of a separate seat base 46 and seat back 50 that are attached to each other, or mounted separately. The seat 42 may also be supported by a seat bracket 54 connected to the main frame tube 15. The rear frame assembly 34 supports a rear portion 34 of the front frame assembly 14, and preferably includes second and third wheels 26, 30 connected to a rear axle 38. In a preferred embodiment, the rear frame assembly 34 is rotatably connected to the front frame assembly 14. Further, in a preferred embodiment the second wheel 26 is rotatably supported at a first end of the rear axle 38, and the third wheel 30 is rotatably supported at a second end of the rear axle 38.

As shown in FIG. 1, the front wheel 18 is rotatably supported by the front fork 58 that in turn is rotatedly coupled to the forward portion 22 of the main frame tube 15 of the front frame assembly 14. The axis of rotation of the front fork 58 is generally perpendicular to the axis of rotation of the front wheel 18. A clutch mechanism (not shown) may be provided within the front wheel 18 so the tricycle 10 can be pushed and the front wheel 18 can rotate, even though a child positioned on the tricycle 10 may have their feet positioned on pedals 62, 64 and may be preventing the pedals 62, 64 from moving. A handlebar assembly 66 is coupled to the front fork 58 such that a turning of the handlebar assembly 66 turns the front wheel 18, and thus the tricycle 10.

Figure 10:
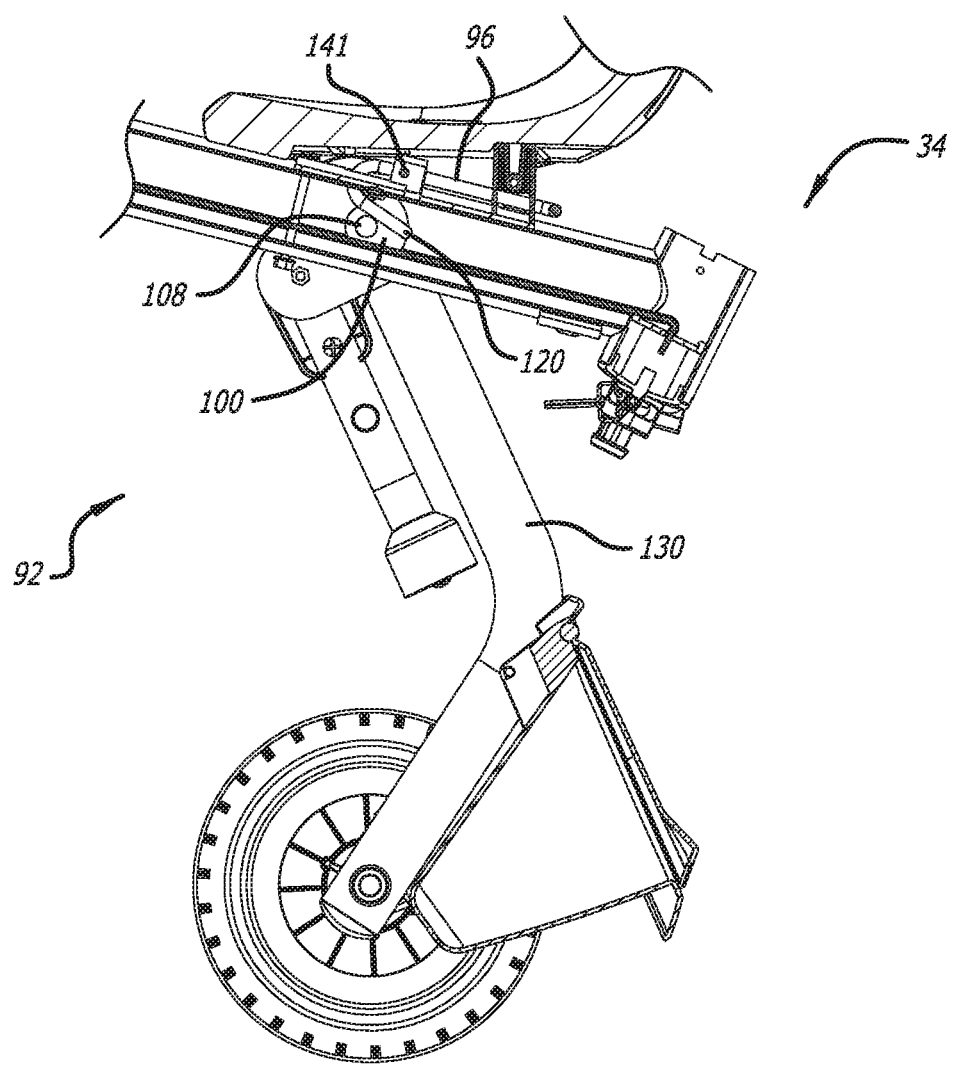
FIG. 10 is a partially cut-away side view of the rear frame of FIG. 6, shown in a storage position.

In one embodiment the foldable tricycle 10 includes a parent steer handle 70. The parent steer handle 70 is connected to a receiver 69 in the main frame tube 15. The steer handle 70 is preferably operatively connected to the front fork 58 such that a rotation of the steer handle 70 about its longitudinal axis within the receiver 69 rotates the front fork 58 to steer the tricycle 10. This may be accomplished through steering rods, a chain, a belt or another mechanical association between the steer handle 70 and the front fork 58, and preferably through the main frame tube 15. In this manner, the steer handle 70 can be used by a parent, or other person, to steer the tricycle 10. In one embodiment, as shown in FIG. 6, the steer handle 70 is positioned behind the seat 50 and does not need to be removed during transition of the foldable tricycle 10 from the use position to the folded position. However, in another embodiment, the steer handle 70 may be removably connected to the tricycle 10 so that the steer handle 70 can be removed from the tricycle 10 for use and/or storage, such as shown in FIGS. 8-10. The steer handle 70 may include a hand grip portion 74 configured for manipulation by the parent, or other person. In an embodiment, a longitudinal length of the steer handle 70 may be adjustable to provide a comfortable handle position for different users that may be steering the tricycle 10, or to reduce required storage space. For example, when a coupling assembly 76 is unlocked, an upper shaft or component 78 may be slid over a lower shaft or component 80, thereby shortening the overall length of the steer handle 70. Alternately, the upper component 78 is slidable with respect to the lower component 80 to adjust a length of the steer handle 70.

Figure 4:
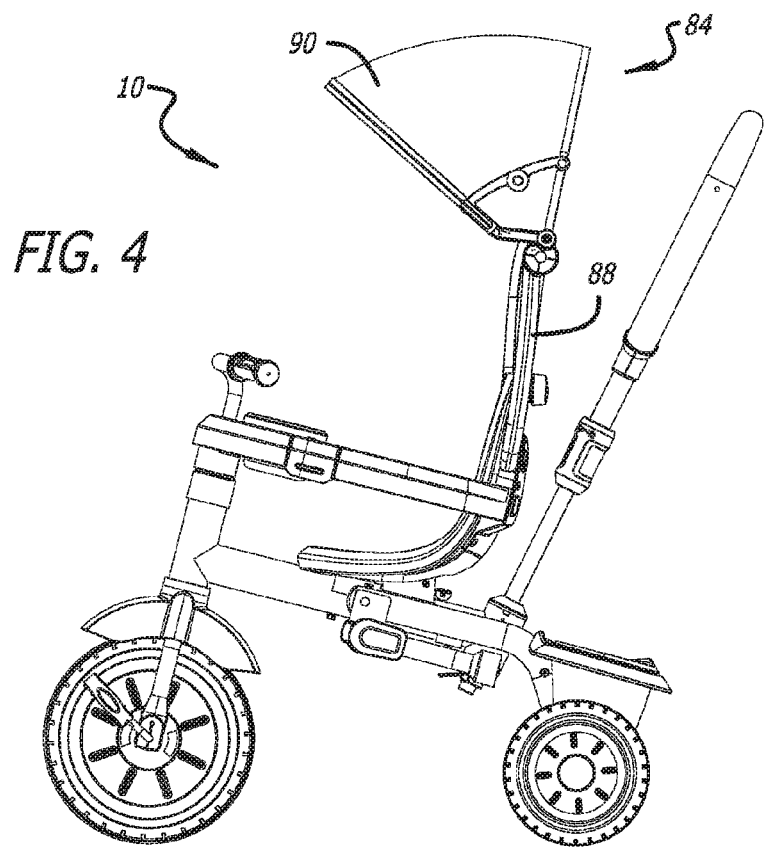
FIG. 4 is a side view of the foldable tricycle of FIG. 1, showing a canopy in a deployed position.
Figure 5:
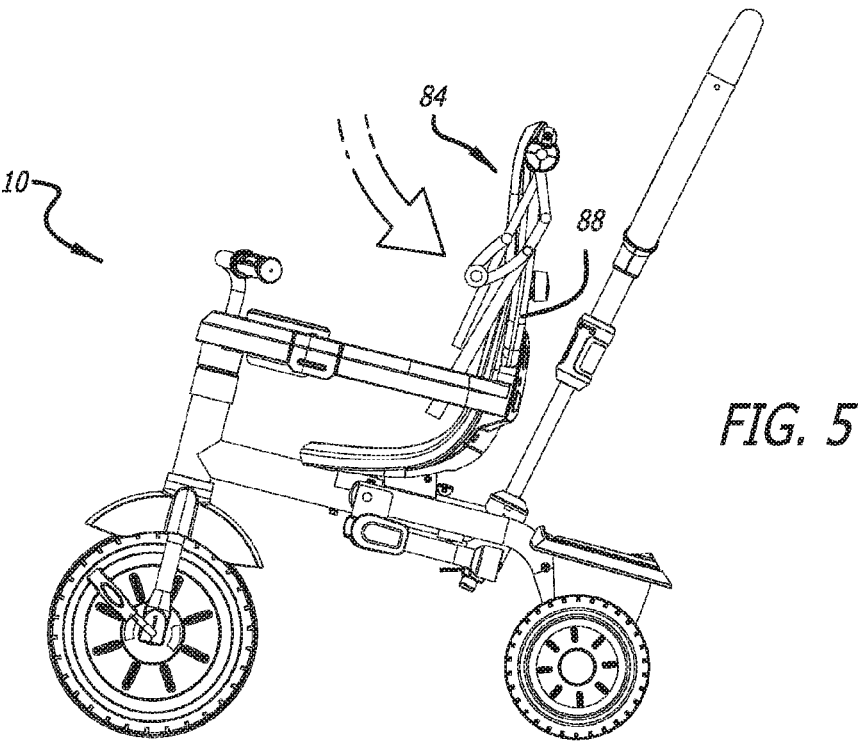
FIG. 5 is a side view of the foldable tricycle of FIG. 1, showing the canopy of FIG. 4 in a retracted position.

Turning now to FIGS. 4 and 5, the foldable tricycle 10 may also include a canopy assembly 84 that may include a plurality of canopy arms 88 and a canopy shield 90. The canopy assembly 84 may be pivotable and extendable to a variety of positions, including deployed and retracted positions shown in FIGS. 4 and 5 respectively, to shield a child seated on the foldable tricycle 10 from the sun or other weather conditions. In an embodiment, the canopy arms 88 may be removably coupled to the seat back 50, as will be disclosed below in conjunction with descriptions of FIGS. 13-15.

Turning now to FIGS. 3 and 6-9, in one embodiment, the foldable tricycle 10 may include the rear frame assembly 34. In an embodiment, the rear frame assembly 34 is pivotally connected to the main frame tube 15 and may be able to pivot between use (FIGS. 1 and 8) and storage (FIGS. 6 and 10) positions. In one embodiment, the rear frame assembly 34 includes rear frame support members 130, 132, a shaft 108 joining a first end of the rear frame support members 130, 132 (see FIGS. 3 and 7), and a support member 133 joining a rear end of the rear frame support members 130, 132. The support member 133 has an arcuate center portion that supports a bottom of the main frame tube 15 in the use position. The shaft 108 preferably has a plate 100 fixed thereto that resides within the main frame tube 15.

The folding tricycle 10 also has a folding system that preferably includes a release assembly 92. In one embodiment, the release assembly 92 may include at least a portion of the rear frame assembly 34, along with an engagement lever 96 and an engagement lever pivot bracket 104. The engagement lever 96 may include a handle section 112, a pin aperture 114, a bend 116 and an engagement section 120. The plate 100 connected to the shaft 108 of the rear frame 34 preferably has a pair of notches, including a use notch 124 and a storage notch 128. The handle section 112 may comprise an integrally formed release handle 129, or the release handle 129 may be attached to the engagement lever 96. The plate 100 may include additional notches (not shown) to allow the rear frame 34 to fold to, and lock into, positions beyond the listed use and storage position.

Referring again to FIGS. 3 and 7, the first end 134, 136 of each respective rear frame support member 130, 132 may be attached to opposite ends of shaft 108. The rear frame support members 130, 132 may be rigidly attached to shaft 108. Similarly, the rear frame support members 130, 132 may be rigidly attached to the support member 133. As such, the rear frame support members 103, 132, the shaft 108 and the support member 133 will preferably all rotate in unison. A frame cutout 140 may exist in the frame 14, and a portion of the rear frame shaft 108 may be rotatably disposed within the frame cutout 140. The rear frame support members 130, 132 may be attached to the rear frame shaft 108 at locations that allow the rear frame shaft 108 to rotate within the frame cutout 140. Specifically, the rear frame support members 130, 132 may be attached to the rear frame shaft 108 on opposite sides of the frame cutout 140. Further, the plate 100 may be rigidly attached to the rear frame shaft 108 such that the plate 100 also rotates in unison with the rear frame support members 130, 132. A main frame support plate 135 may cover the cutout 140 after the rear frame 34 is connected to the main frame tube 15 (see FIG. 8).

In operation, the engagement lever 96 may pivot about a longitudinal axis of a pin 141 passing through both the pin aperture 114 and apertures in the engagement lever pivot bracket 104. The engagement lever pivot bracket 104 is secured to the main frame tube 15. As a user manipulates the release handle 129, the engagement lever 96 may pivot about the pin 141 and alter the position of the engagement section 120 of the engagement lever 96. The engagement section 120 may be shaped such that it may interfere with the rotation of the plate 100 when the engagement lever 96 is released. More specifically, the engagement section 120 may interface, or engage, with one of the notches 124, 128 in the plate 100, preventing plate 100, and thus rear frame shaft 108, rotation about a rear frame shaft 108 longitudinal axis.

Alternatively, when a force is put on the engagement lever 96 by a user, see FIG. 9, to rotate the engagement lever 96, the engagement section 120 may not engage with either notch 124, 128, and thus not interfere with plate 100 rotation. In this manner, user manipulation of the release handle 129 may determine a position of the engagement section 120. Further, the engagement lever 96 may be spring-biased in a particular direction. For example, the release handle 129 may be biased away from the seat 42 and toward the main frame tube 15 with a biasing member, such as a spring. Additionally, the engagement lever 96 may be biased with a biasing member such that the engagement section 120 is biased towards the plate 100 to retain the engagement section 120 of the engagement lever 96 in notches 124, 128.

In an embodiment, the engagement section 120 may engage with the use notch 124, and prevent plate 100 rotation. In this configuration, the rear frame 34 may be fixed in the use position (see FIG. 8) as the rear frame support members 130, 132, plate 100 and rear frame shaft 108 are prevented from rotating in unison about a longitudinal axis of the rear frame shaft 108. In another embodiment, the engagement section 120 may engage with the storage notch 128 and to prevent plate 100 rotation and to maintain the rear frame 34 in the storage position (see FIG. 10). In this configuration, the rear frame 34 may be fixed in the storage position. Alternatively, when a force is applied by the user on the release handle 129 toward the seat 42, the engagement section 120 will be rotated away from the plate 100 and thus may not interfere with any notch 124, 128 to allow the rear frame 34 to rotate, for example, when the tricycle 10 is transitioning between use and storage positions (see FIG. 9). Accordingly, the position of the engagement section 120, which may be influenced by a user's manipulation of the handle section 112, may determine if the plate 100, and thus the rear frame 34, is locked in a particular position or free to transition between positions. Allowing use and storage positions, along with the ability to transition between said positions, enables a foldable tricycle 10 to require less dimensional space when not in use and placed in the storage position. Additionally, the folding tricycle 10 may be able to independently stand upright when configured in the use or storage position, adding convenience and flexibility.

The rear frame support members 130, 132 may support the rear axle 38, the second and third wheels 26, 30 and a storage bin 144, as best shown in FIG. 7. Each of these elements (130, 132, 38, 26, 30, and 144) may fold with the rear frame 34 as the rear frame support members 130, 132 transition between, and lock in, various positions. Additionally, the folding of the tricycle 10 may not interfere with a steering linkage between the steer handle 70 and the front fork 58.

Figure 11:
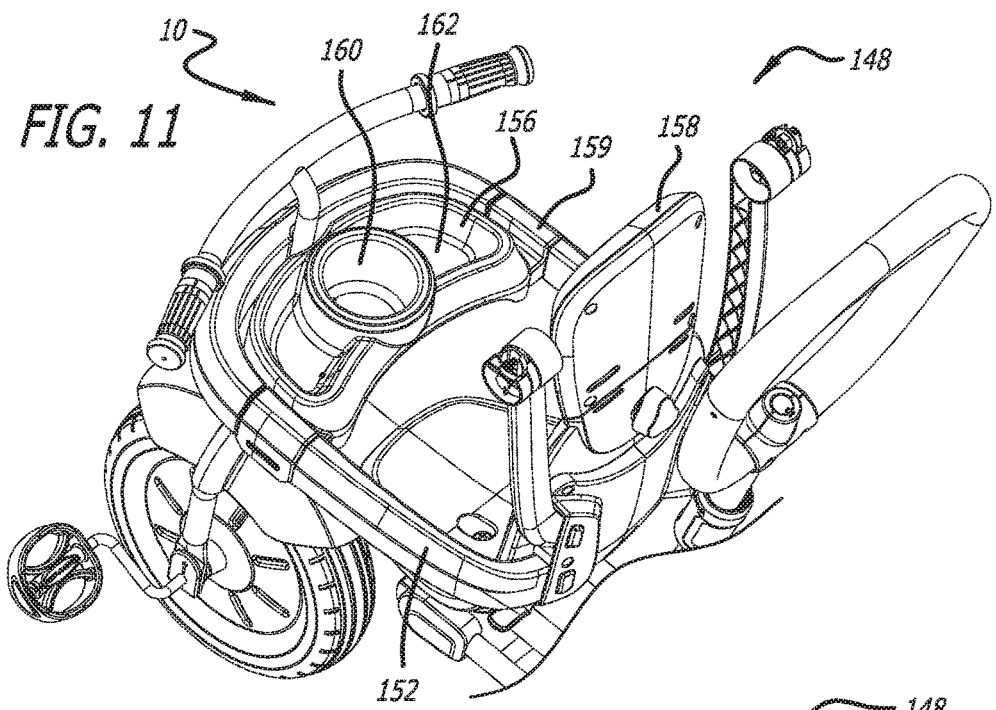
FIG. 11 is a partial rear-top perspective view of the foldable tricycle of FIG. 1, showing a tray in a use position.
Figure 12:
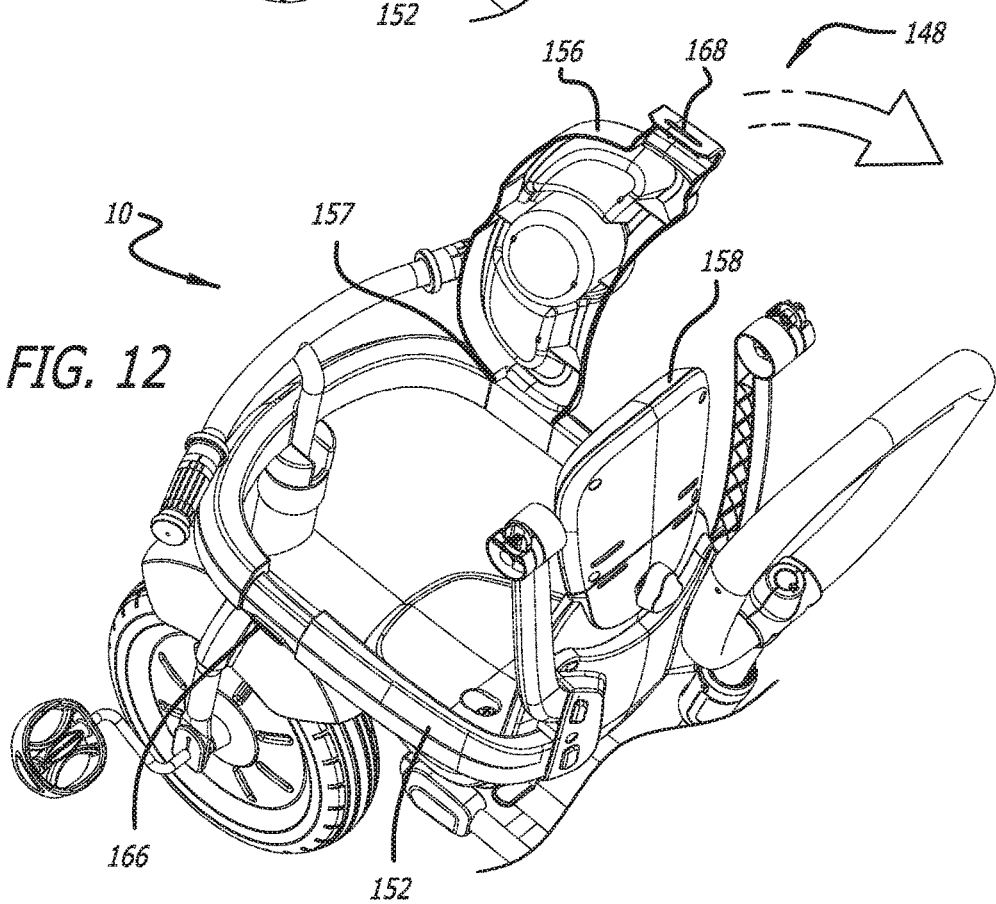
FIG. 12 is a partial rear-top perspective view of the foldable tricycle of FIG. 1, showing the tray of FIG. 11 in an open position.

Turning to FIGS. 11 and 12, the foldable tricycle 10 may include a restraint system 148 in one embodiment. The restraint system 148 may aid in securing a child in the seat 42, facilitating the child's removal from the seat 42 or providing storage for possessions. The restraint system 148 may include a restraint hoop 152 and a tray 156. It may also include a headrest 158. The tray 156 may include a drink holder 160, which may be configured to hold a drinking vessel, and one or more storage compartments 162. The restraint hoop 152 and tray 156 may be integrated into a single part, or may exist as discrete parts. In one embodiment, the tray 156 extends from one side of the restraint hoop 152 to an opposing side of the restraint hoop 152. Further, in one embodiment one end of the restraint hoop 152 is connected to the seat 42 and an opposing end of the restraint hoop 152 is connected to the seat 42 to secure the restraint hoop 152 to the seat 42. Additionally, the restraint hoop 152 may have a connection member 169 that removably connects the restraint hoop 152 to one of the handle bar assembly 66 or the front portion 22 of the frame 14.

In a further embodiment, the tray 156 may have first and second ends. The first end of the tray 156 may be removably connected to the restraint hoop 152, and the second end of the tray 156 may be connected to the restraint hoop 152 such that the tray 156 is able to rotate relative to the restraint hoop 152. Alternatively, the second end of the tray 156 may be connected to the restraint hoop 152 with a connection member 159, and the second end of the tray 156 may have a pivot member 157 adjacent the connection member 159. The tray 156 may rotate relative to the restraint hoop 152 about a rotation axis at the pivot member 157. In a further alternate embodiment, the restraint hoop 152 may include a cylindrical portion that the tray 156 may surround and rotate about. Further, elements in the tray 156 or restraint hoop 152 may allow a relative rotation of a certain angular range. For example, this angular range could comprise approximately 90 degrees, slightly more than 90 degrees or more than 90 degrees. Additionally, the tray 156 could be positioned in a use position, as shown in FIG. 11, or in an access position, as shown in FIG. 12.

In another embodiment, a portion of the tray 156, such as the first end, may be releasably attached to the restraint hoop 152 such that relative rotation between the tray 156 and restraint hoop 152 is prevented. In an embodiment, a rib 166 on the restraint hoop 152 and a tray cutout 168 in the tray 156 may releasably attach a second end of the restraint hoop 152 to the tray 156 when the rib 166 engages and enters the tray cutout 168. A portion of the tray 156 may comprise a material, or design, with sufficient compliance for a user to allow the rib 166 to engage with the tray cutout 168, and for the user to allow the rib 166 to disengage with the tray cutout 168 to allow for rotation of the tray 156.

Figure 13:
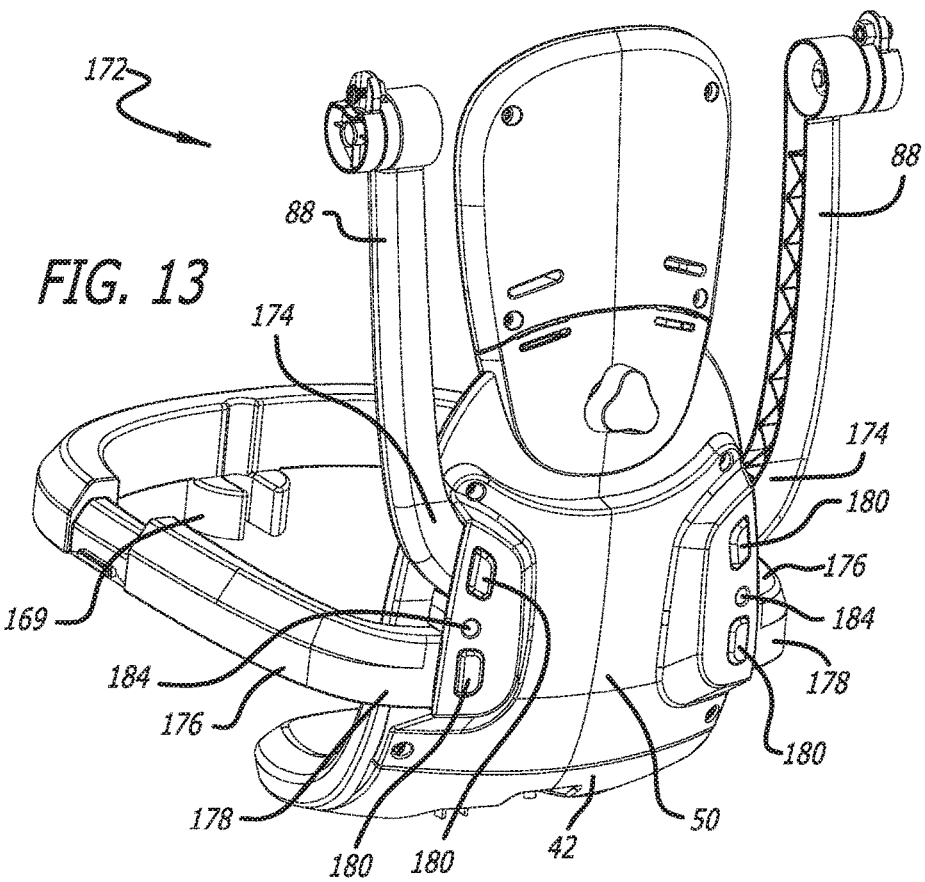
FIG. 13 is a partial rear perspective view of the foldable tricycle of FIG. 1, showing a seat with releasably attached canopy arms and hoop arms.
Figure 14:
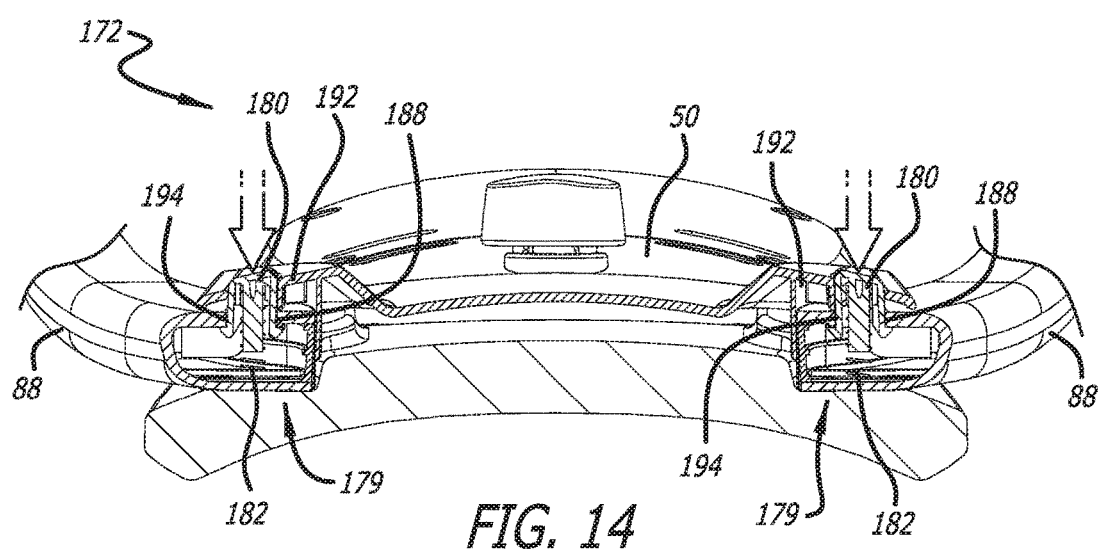
FIG. 14 is a partial cross-sectional bottom view of the seat of FIG. 13, showing canopy arms and attachment mechanisms.
Figure 15:
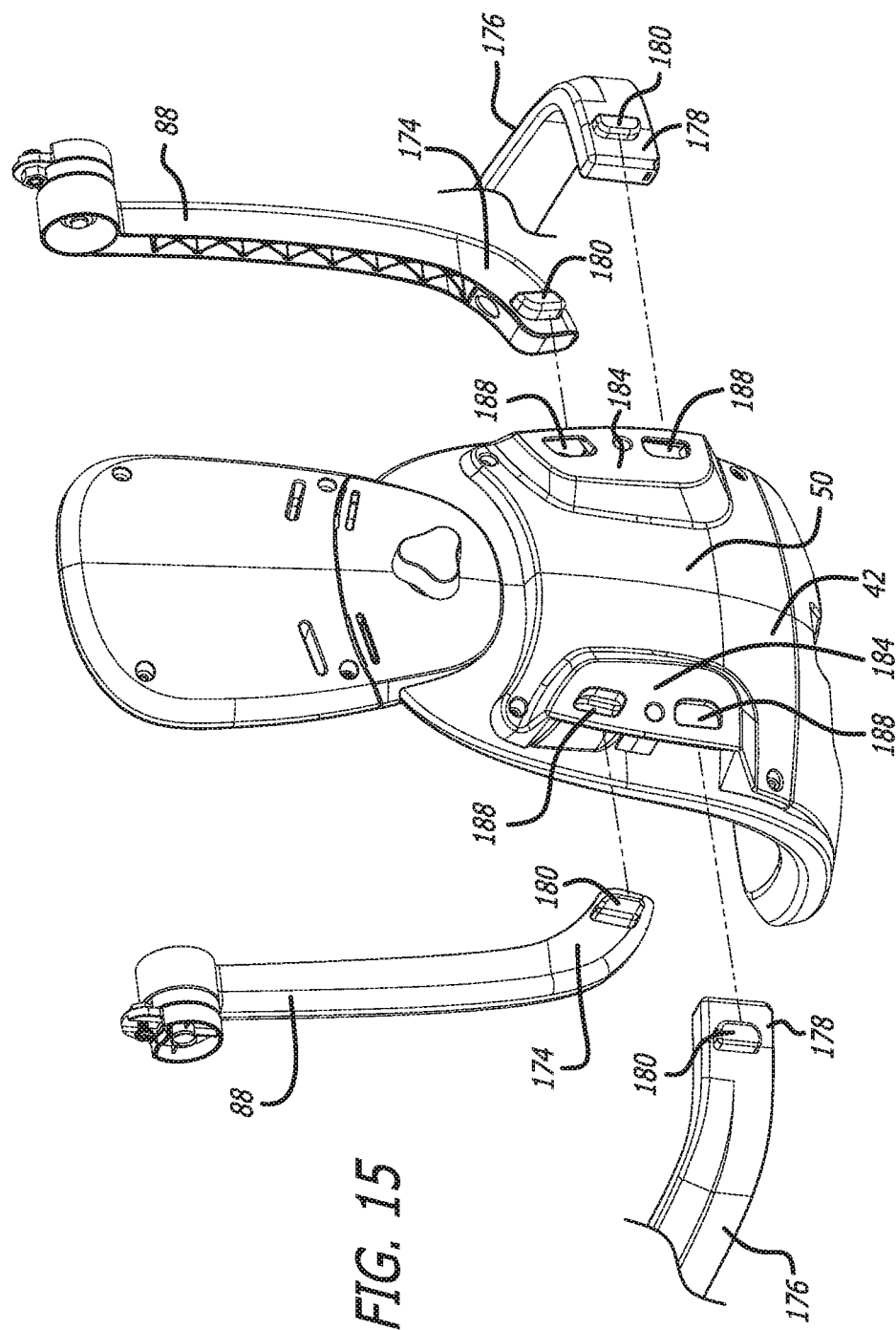
FIG. 15 is a partial rear perspective exploded view of the seat of FIG. 13, showing detached canopy arms and hoop arms

Turning now to FIGS. 13-15, the foldable tricycle 10 may include an arm attachment system 172 in a further embodiment. The arm attachment system 172 may comprise canopy arms 88 and each canopy arm 88 may include a canopy arm attachment end 174. Additionally, the arm attachment system 172 may include hoop arms 176 and each hoop arm 176 may include a hoop arm attachment end 178. In an embodiment, each canopy arm attachment end 174 and hoop arm attachment end 178 may include a quick release arm attachment mechanism 179. Each arm attachment mechanism 179 may include a release member or button 180 and an arm spring 182, and each arm spring 182 may bias each corresponding release member 180 in a particular direction.

The arm attachment system 172 may provide for removably attaching the canopy arms 88, hoop arms 176 or both canopy and hoop arms 88, 176 to an arm receiver 184. In one embodiment, the arm receiver 184 may be attached to the seat back 50, or to another part of the folding tricycle 10. A release member or button aperture 188 and an arm dock 192 may be provided in the arm receiver 184 for each arm 88, 176. Each canopy arm attachment end 174 and hoop arm attachment end 178 may be insertable into an arm dock 192. Further, when each respective attachment end 174, 178 is inserted into an arm dock 192, the button 180 on each attachment end 174, 178 may be biased by arm spring 182 and enter a respective button aperture 188, preventing attachment end 174, 178 movement while the button 180 is disposed within, or through, a respective button aperture 188. More specifically, each attachment end 174, 178 may be prevented from exiting a respective arm dock 192 while the button 180 is disposed within, or through, a respective button aperture 188.

As each quick release button 180 is biased by a respective arm spring 182, the button 180 may also be slidably disposed within a button track 194 in an arm attachment mechanism 179. Accordingly, a user can press, or manipulate, a button 180 and cause it to slide along the button track 194. In an embodiment, a user may press a button 180, cause it to slide along the button track 194 against the arm spring 182 bias through the button aperture 188, and thereby cause the button 180 to no longer be disposed within the button aperture 188. When such an action is taken, the button 180 may no longer be disposed within a respective button aperture 188 and may no longer prevent the canopy arms 88 and hoop arms 176 from exiting the respective arm dock 192. Accordingly, such an action may allow the arms 88, 176 to be removed from their respective arm docks 192.

Inserting an attachment end 174, 178 into an arm dock 192 may be accomplished by inserting the attachment end 174, 178 into a respective arm dock 192. In an embodiment, inserting an attachment end 174, 178 into an arm dock 192 may further require a user to manipulate a respective button 180 against the arm spring 182 bias. The arm attachment system may thus allow the easy removal and attachment of the arms 88, 176 from the arm receiver 184. This ability may be useful for storage purposes, shipping purposes or to remove or add features, such as the canopy assembly 84 or restraint hoop 152.

Figure 16:
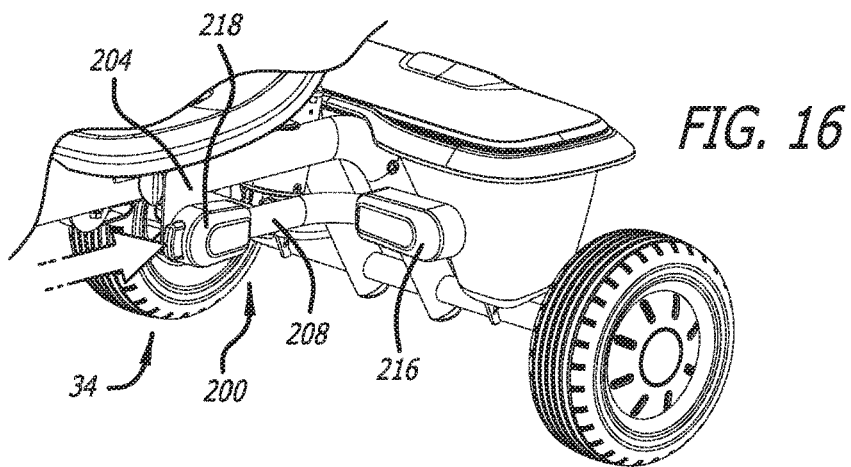
FIG. 16 is a partial front perspective view of the foldable tricycle of FIG. 1, showing a footrest system in a storage position.
Figure 17:
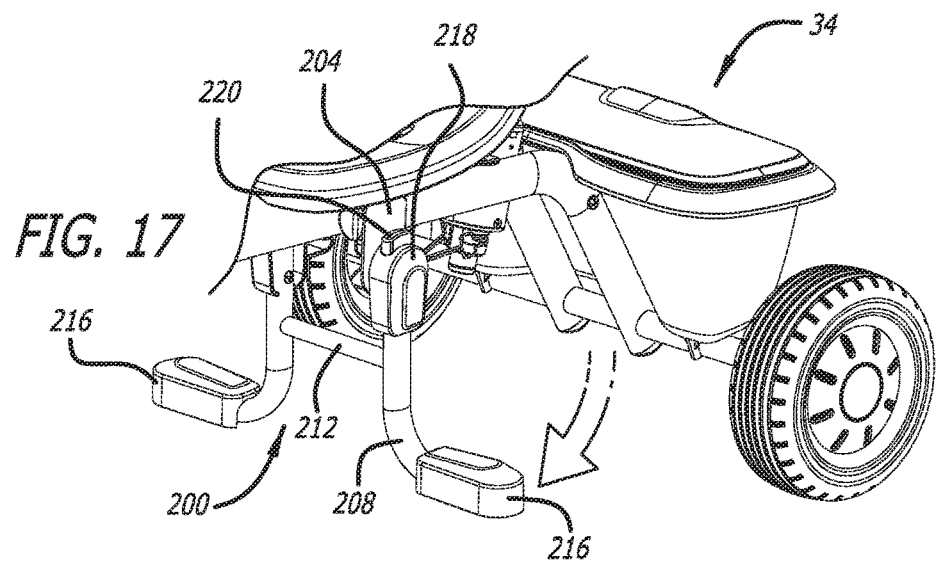
FIG. 17 is a partial front perspective view of the foldable tricycle of FIG. 1, showing the footrest system of FIG. 16 in a use position.
Figure 18:
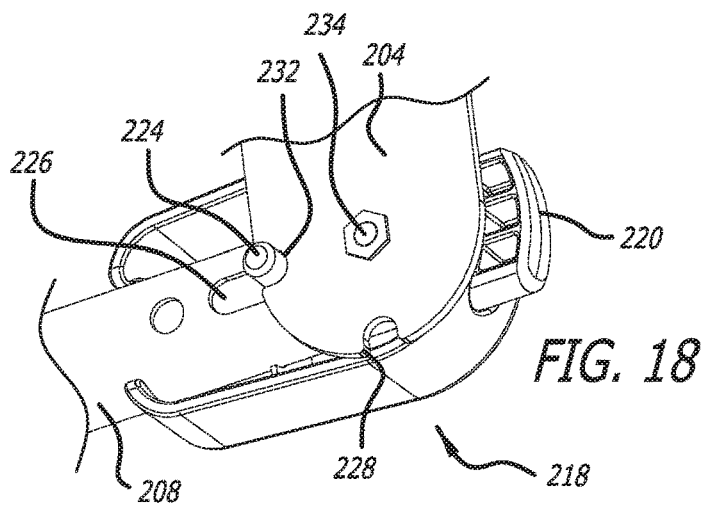
FIG. 18 is a partial lower perspective view of a footrest rotation mechanism.

Turning now to FIGS. 16-18, the foldable tricycle 10 may also include a footrest system 200 in an embodiment. The footrest system 200 may include a mounting member or plate 204, one or more footrest support members 208, a cross member 212 between multiple footrest support members 208, a footrest 216 on each footrest support member 208 and a quick release footrest rotation mechanism 218. The mounting plate 204 may be affixed to the frame 14, rear frame 34, rear frame shaft 108, a rear frame support member 130, 132 or another part of the foldable tricycle 10. In a preferred embodiment, the mounting plate 204 is connected to the rear frame support member 130, 132. The footrest 216 may be a discrete element, or may be integrally formed with each footrest support member 208. The footrest rotation mechanism 218 may include a footrest button 220, a footrest spring (not shown), a footrest pin 224 and a footrest pin track 226. Further, the mounting plate 204 may include a footrest use receiver 228 and a footrest storage receiver 232. In one embodiment the footrest use receiver is a footrest use notch 228 and the footrest storage receiver is a footrest storage notch 232. The footrest support member 208 may be rotatably attached to the mounting plate 204 at a footrest rotation point 234.

In operation, the footrest pin 224 may be operatively associated with the footrest button 220 such that a movement of the button 220 may cause a corresponding movement of the footrest pin 224. The footrest pin 224 may be slidably disposed in the footrest pin track 226 and a user manipulating the footrest button 220 may slide the footrest pin 224 along the footrest pin track 226. Further, the footrest button 220 and footrest pin 224 may be biased in a particular direction by the footrest spring. Further, the footrest pin 224 may be adapted to selectively engage the footrest use receiver 228 and the footrest storage receiver 232.

The footrest rotation mechanism 218 and a corresponding footrest support member 208 may be attached and may rotate in unison. The footrest pin 224 may engage with a notch 228, 232 and prevent rotation of the footrest rotation mechanism 218 and attached footrest support member 208. When the footrest pin 224 is engaged with the footrest storage notch 232, the footrest system 200 may be positioned, and locked, in a storage position. When the footrest pin 224 is engaged with the footrest use notch 228, the footrest system 200 may be positioned in, and locked in, a use position. In an embodiment, a user manipulation of the footrest button 220 may cause the footrest pin 224 to disengage from a notch 228, 232, thus allowing footrest system 200 rotation and transition between use and storage configurations. The footrest spring may bias the footrest pin 224 against a notch 228, 232 when engaged, ensuring footrest system 200 rotation is prevented. In this manner, a user can transition the footrest system 200 between a use position, shown in FIG. 17, and a storage position, shown in FIG. 16 by manipulating the footrest button 220, rotating the footrest system 200 to the new position and then refraining from manipulating the footrest button 220. The footrest system 200 may exist, and allow transitions between positions, independent of systems for tricycle 10 steering, folding or other operations. Accordingly, the disclosure allows a user to deploy and use the footrest system 200 when needed, or store the footrest system 200 when not needed. Further, the footrest system 200 may be removed from the tricycle 10 if desired by a user.

Several alternative examples have been described and illustrated herein. A person of ordinary skill in the art would appreciate the features of the individual embodiments, and the possible combinations and variations of the components. A person of ordinary skill in the art would further appreciate that any of the examples could be provided in any combination with the other examples disclosed herein. Additionally, the terms "first," "second," "third," and "fourth" as used herein are intended for illustrative purposes only and do not limit the embodiments in any way. Further, the term "plurality" as used herein indicates any number greater than one, either disjunctively or conjunctively, as necessary, up to an infinite number. Additionally, the word "including" as used herein is utilized in an open-ended manner.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. The present examples and embodiments, therefore, are to be considered in all respects as illustrative and not restrictive, and the invention is not to be limited to the details given herein. It is intended by the following claims to claim any and all applications, modifications and variations that fall within the true scope of the present teachings. Accordingly, while the specific embodiments have been illustrated and described, numerous modifications come to mind without significantly departing from the spirit of the invention and the scope of protection is only limited by the scope of the accompanying Claims.

What is claimed is:

1. A tricycle comprising:
a front frame assembly having a main frame tube, a front fork, a front wheel rotatably connected to the front fork, a seat connected to the main frame tube, and a handlebar assembly coupled to the fork to allow for steering of the tricycle, wherein the front fork and front wheel support a forward portion of the front frame assembly;
a rear frame assembly connected to the main frame tube adjacent a rear portion of the front frame assembly to support the rear portion of the front frame assembly, the rear frame assembly having two wheels; and,
a restraint hoop connected to the seat and extending toward the front fork, the restraint hoop having a first hoop arm and a second hoop arm, the restraint hoop further having a tray extending from the first hoop arm to the second hoop arm, the tray having a first end and a second end, the first end of the tray being removably connected to the first hoop arm, the second end of the tray having a pivot member to allow the first end of the tray to pivot away from the first hoop arm when the first end is disconnected from the first hoop arm to allow for insertion and removal of a child from the seat, wherein the restraint hoop has a first end connected to the seat and a second end connected to the seat, and wherein the restraint hoop further has a connection member removably connected to one of the handle bar assembly and the front frame assembly.

2. The tricycle of claim 1, wherein the rear frame assembly is pivotally connected to the main frame tube adjacent a rear portion of the front frame assembly, wherein the rear frame assembly comprise a first rear frame support member on one side of the main frame tube, a second rear frame support member on an opposing side of the main frame tube, and a pivot shaft connecting the first and second rear frame support members and extending through the main frame tube, and further comprising a release assembly connected to both the front frame assembly and the rear frame assembly to secure the rear frame assembly to the front frame assembly in a use position, the release assembly being moveable to allow for transitioning the rear frame assembly to a storage position and for securing the rear frame assembly in the storage position.

3. The tricycle of claim 1, wherein the restraint hoop has a rib, and wherein the first end of the tray has cutout that receives the rib to removably connect the first end of the tray to the first hoop arm of the restraint hoop.

4. The tricycle of claim 1, wherein the seat has a receiver having a dock and a release member opening, wherein the first hoop arm has an attachment end having a quick release arm attachment mechanism comprising a release member and an arm spring, wherein the dock is sized to receive the attachment end of the first hoop arm, and wherein the release member is retained in the release member opening when the first hoop arm is inserted into the dock.

5. A tricycle comprising:
a front frame assembly having a main frame tube, a front fork, a front wheel rotatably connected to the front fork, a seat connected to the main frame tube, and a handlebar assembly coupled to the fork to allow for steering of the tricycle, wherein the front fork and front wheel support a forward portion of the front frame assembly;
a rear frame assembly connected to the main frame tube adjacent a rear portion of the front frame assembly to support the rear portion of the front frame assembly, the rear frame assembly having two wheels; and,
a restraint hoop releasably connected to the seat and extending toward the front fork, the restraint hoop having a first hoop arm and a second hoop arm, wherein the seat has a receiver having a dock and a release member opening, wherein the first hoop arm has an attachment end having a quick release arm attachment mechanism comprising a release member and an arm spring, wherein the dock is sized to receive the attachment end of the first hoop arm, and wherein the release member is retained in the release member opening when the first hoop arm is inserted into the dock.

6. The tricycle of claim 5, wherein the rear frame assembly is pivotally connected to the main frame tube adjacent a rear portion of the front frame assembly, the rear frame assembly having a first rear frame support member on one side of the main frame tube, a second rear frame support member on an opposing side of the main frame tube, and a pivot shaft connecting the first and second rear frame support members and extending through the main frame tube, and wherein the tricycle is adapted to transition from the use position to the storage position when the restraint hoop is connected to the seat.

7. The tricycle of claim 5, wherein the restraint hoop further has a connection member removably connected to one of the handle bar assembly and the front frame assembly.

8. The tricycle of claim 5, further comprising a canopy releasably connected to the seat.

9. The tricycle of claim 8, wherein the seat has a receiver having a dock and a release member opening, wherein the canopy has a canopy arm having an attachment end having a quick release arm attachment mechanism comprising a release member and an arm spring, wherein the dock is sized to receive the attachment end of the canopy arm, and wherein the release member is retained in the release member opening when the canopy arm is inserted into the dock.

* * * * *